United States Patent [19]
Normile et al.

[11] Patent Number: 5,872,865
[45] Date of Patent: Feb. 16, 1999

[54] METHOD AND SYSTEM FOR AUTOMATIC CLASSIFICATION OF VIDEO IMAGES

[75] Inventors: James Normile, Woodside; Katherine Wang, San Jose, both of Calif.

[73] Assignee: Apple Computer, Inc., Cupertino, Calif.

[21] Appl. No.: 386,308

[22] Filed: Feb. 8, 1995

[51] Int. Cl.$^6$ ..................................................... G06K 9/62
[52] U.S. Cl. .......................................... 382/224; 382/165
[58] Field of Search ..................................... 382/165, 190, 382/224, 225, 205, 217, 218, 221; 364/725; 348/526

[56] References Cited

U.S. PATENT DOCUMENTS

| 5,054,093 | 10/1991 | Cooper | 382/224 |
| 5,060,277 | 10/1991 | Bokser | 382/225 |
| 5,164,992 | 11/1992 | Turk et al. | 382/224 |
| 5,181,259 | 1/1993 | Rorvig | 382/225 |
| 5,519,789 | 5/1996 | Etoh | 382/225 |

OTHER PUBLICATIONS

Smoliar, S.W. and Zhang, H., "Content–Based Video Indexing and Retrieval", IEEE Multimedia, pp. 62–72, 1994.

*Primary Examiner*—William Cumming
*Assistant Examiner*—Brian L. Johnson
*Attorney, Agent, or Firm*—Fenwick & West LLP

[57] ABSTRACT

A computer system and computer implemented method automatically classify video sequences into categories. A set of categories is defined either manually through the association of selected video sequences with user supplied category designations, or automatically through segregation of a set of video sequences into groups of similar sequences. Input video sequences are then classified by either pixel decomposition or primitive attribute decomposition; the former analyzing each image on a pixel basis, the latter employing extracted image information. Categories can be trained as new video sequences are input into the system, or new categories can be created to accommodate such new sequences that are dissimilar from existing categories.

13 Claims, 7 Drawing Sheets

METHOD AND SYSTEM FOR AUTOMATIC CLASSIFICATION OF VIDEO IMAGES

RELATED APPLICATION

This application is related to co-pending application Ser. No. 08/315,965 entitled, METHOD AND SYSTEM FOR SEARCHING GRAPHIC IMAGES AND VIDEOS filed on Sep. 30, 1994, which is incorporated herein by reference.

BACKGROUND OF THE INVENTION

1. Field of the Invention

The invention relates to methods and systems for the image analysis, and more particularly, to methods and systems for automatically classifying images into categories.

2. Description of the Background Art

There is currently a growing demand for computer systems that can produce, edit, and manipulate graphic images, and in particular, for systems that can create, edit, or manipulate digitized video images. This demand is generated by several market influences and consumer trends. There has been, and will continue to be, steady growth in the multimedia marketplace for computer-based products that integrate text, audio, graphics and increasingly video, for educational, entertainment, and business purposes. Also, the use of video for educational or business presentations and for artistic or personal applications has become increasingly popular as the costs of video production equipment has fallen. Products ranging from video games to computerized encyclopedias to computerized training guides now commonly employ digitized video to entertain, educate, and instruct.

These consumer trends are matched by various technological advances that have made widespread the use of video for computer based applications. Equipment to digitize video at high speed and quality has allowed software designers to integrate video into commercial software products such as computer games, and has allowed individual computer users to incorporate video into business presentations or other similar projects. Improvements in telecommunications and network technologies, such as increased transfer rates, bandwidth, and the like, have made realistic the opportunity for computer users of all types to access online libraries of video with acceptable speed and quality.

The rise of desktop video production, including the development of video compression standards such as MPEG, have reduced the cost of video production systems, making pre- and post- production systems accessible to more users and businesses. There are now available a number of software products for multimedia authoring that handle video, graphics, audio, animation in the development environment. Such technologies have been made possible by increases in microprocessor power coupled with dramatic reductions in cost. Personal computers now offer performance previously found only in engineering workstations, or mainframes.

In addition to computation power and sophisticated software, improvements in storage capacities and compression technologies have increased the ability to store digitized video, which typically requires large storage needs. Uncompressed NTSC quality video requires 15 Mb per second for 30 fps video, or almost 1 Gb for a minute's worth of video. The MPEG standard for video image compression provides for a 40:1 compression ratio, allowing a hour's video footage in about 1.3 Gb of storage capacity. Compression also facilitates network access, and thus the developments of video libraries that allow user to select and retrieve video footage in real, or near real time.

All these factors have produced a demand for systems and products that aid the storage, identification, and retrieval of graphic images and video. This is because designers of multimedia software products, computer graphic artists, and even individual users, often have extensive libraries of digitized photographs, digitized video, or other computer generated graphic images, for incorporating such materials in multimedia products. Thus a designer may have hundreds, or thousands, of images of people, animals, urban settings, landscapes, sporting events, or any other category of images, and may have hours of similarly diverse video footage, all useful for creating multimedia presentations. Similarly, with the emergence of desktop video production, video producers will typically develop extensive libraries of video for use by themselves, or others, to aid in the creation of new works. Other businesses that have existing libraries of video, and that generate large quantities of video, such as television stations, film studios, and the like, will eventually produce and store increasing quantities of video using computers and mass storage devices.

To effectively use a library of images or video, the software designer must be able to retrieve an image or video according to certain visual attributes or characteristics in the image. For example, the designer may need an single image or even video footage of a sunset over a ocean shore for a given project, and would need a way to locate that image from many other images, without having to review many hours of video, or numerous photographs that may or may not match the desired visual characteristics of the image. In the past, such retrieval was manually performed. For computer based image retrieval to be useful, some type of image analysis and classification of the visual characteristics of the images is necessary in order to speed up the retrieval process and make computer based storage an effective and efficient tool.

The visual attributes or statistical qualities of images have been extensively researched, and there are many techniques for determining various aspects of an image, such as density and distribution of its colors, the presence and degree of motion between two images, the presence and position of distinct objects, and the like. However, most of these techniques have been developed for use in two principal areas, compression techniques for communicating or storing images and video, and pattern recognition techniques for determining whether a particular image matches a given reference, such in industrial part inspection.

These various image analysis techniques have not previously been used for classifying images. Rather, classifying images is typically based on storing images in a database with descriptive text annotations. The designer then searches by inputting a text description of an image and attempting to locate images that have a matching text description. There are numerous problems with using this approach to classify images and video.

First, a human observer must view each image in the database. This is an extremely time consuming process, especially in a database that may contain thousands of images, and must be repeated for each image added to the database. Second, during viewing, the observer must decide which visual elements of an image are significant in determining the proper classification of the image. This subjective judgment may overlook various image details that may later be part of image characteristics for which the user is searching by reviewing a list of classification. Thus the observer may not note or descriptive specific objects in the background of image, or implicit elements of an image or video such as panning or zooming. Even in still images, the user may overlook significant colors, shapes, the presence of persons, or other elements. As a result of these subjective judgments, the observer's classification of the image may be either too general (classifying an image of a sunset over the beach as merely a "Sun & Sky") or too specific ("Sunset on The Strand"). When the classification is too general, many dissimilar images will be included in the classification, thereby diluting the value of the classification for discriminating images. Where the classification is too narrow, too few images will be included in later classifications, thus increasing the number of distinct classifications that the user must review in order to locate a desirable image.

Classifying video even more difficult and time consuming. In order to classify a video, an observer must view the entire video, noting its various contents, such as different scenes, and when each occurs, along with a description of each scene and aspects significant for later retrieval. Again, not every feature will be noted by the observer; this is an even more significant problem for video since there is typically more "content" to a video in terms of varying images than a single photograph, and thus a single classification of video is likely be inadequately descriptive of all of the content. None of these approaches use computer based analysis of the images to classify a desired image.

Pattern recognition techniques have been previously used to classify images with computers. These techniques have usually been specialized to a particular field, for example analysis of satellite imagery or component identification for defect analysis. In addition, these techniques have typically dealt only with still images not video. Existing techniques have generally hardwired the classification engine since only a small number of known categories is typically of interest. However, for general video analysis it is necessary to provide more flexible classification methods and to allow inclusion of time based features such as motion.

Accordingly, it is desirable to provide various methods for classifying images according to their image attributes for later retrieval. Where a user creates numerous images or is constantly adding such images to an image database, automatic classification of images should categorize new images on the basis of various user supplied criteria. In addition, it is desirable to provide for adaptive learning of the user's classification of images based on image attributes in user classified images.

SUMMARY OF THE INVENTION

The invention provides a method of automatically classifying images and video sequences by developing a set of categories, each category represented by a set of eigen vectors and eigen values in a vector space. The vector space can be defined by primitive attributes of the images, such as color, texture, motion, luminance, and the like, or by a generalized pixel decomposition. The eigen vectors representing each category are determined from images or video sequences that are designated as belonging to the category. This set of images is used as a training set for the category.

A category is trained, and the eigen vectors are determined for a category, by generating matrices of dot products between each combination of images or video sequences in the category. The highest energy eigen values and associated vectors are extracted as the basis set for the category. The images or video sequences in a given category can determined either by the user or automatically. The user determines the images by selecting various images or video sequences, as graphically representing on a display, and designating them for inclusion in a particular category. The system can automatically determine the categories by determining a set of primitive attributes for each image or video sequence, and then associating images or sequences having similar primitive attribute values into distinct categories.

Once the eigen vectors are determined, then a new video sequence or image can be classified by projecting the image or frames of a video sequence onto the eigen vectors for each category. A distortion value is measured, representing the distance between projected value of the image on the eigen vectors, and the eigen values for all images or video sequences in the category. Where the projection is done for each primitive attribute, the distortion for an image is taken as the weighted sum of the various individual distortions for each primitive attribute. The distortion values for all categories are compared, and the image or video sequence is classified in the category having the lowest distortion value. If the lowest distortion value exceeds a predetermined threshold, then either a new category can be created for the image or video sequence, or the category with the lowest distortion can be retained including the new image in the training set.

DETAILED DESCRIPTION OF THE INVENTION

Figure 1:
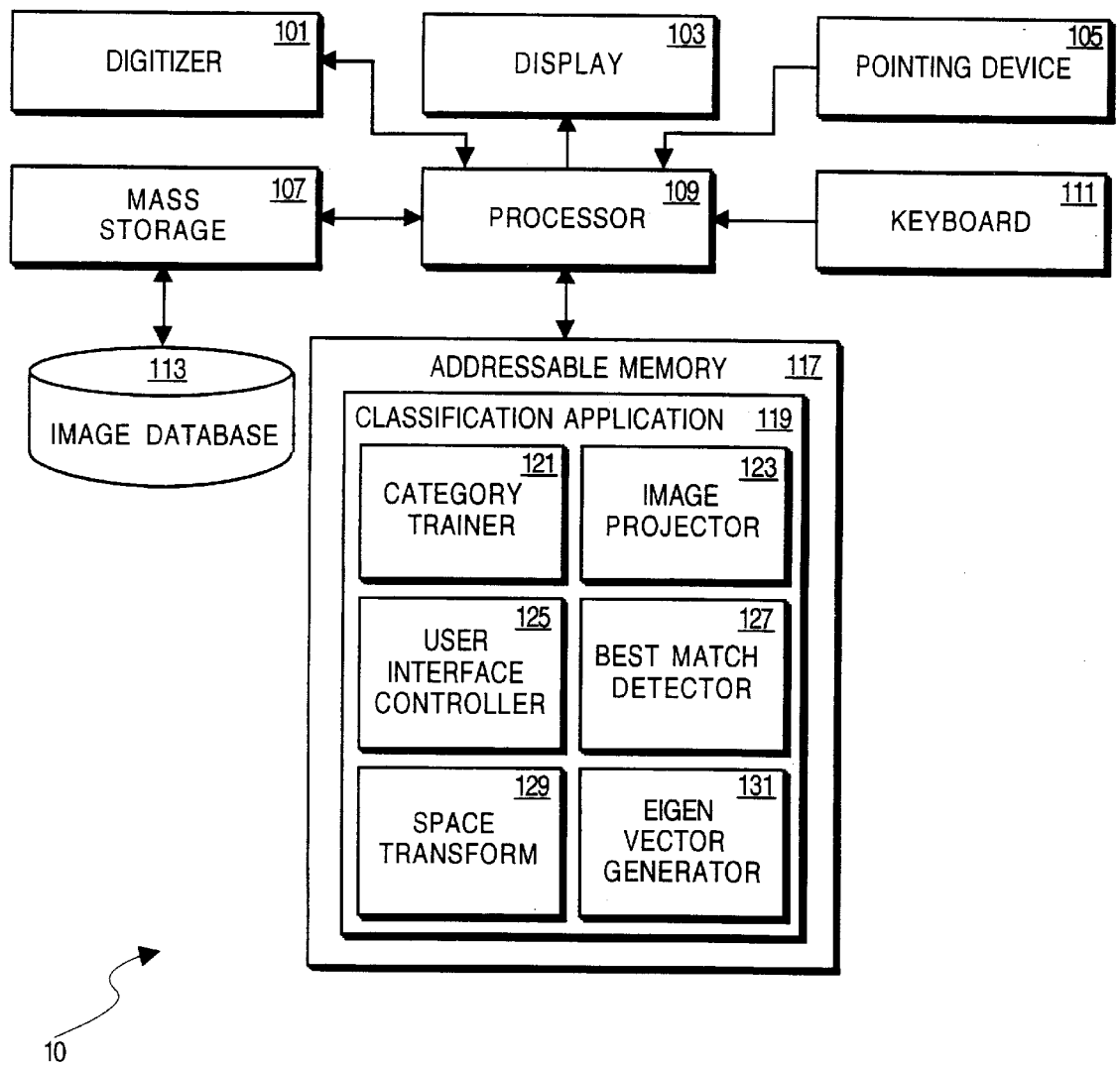
FIG. 1 is an illustration of a system 10 for automatic classification of video images.

Referring now to FIG. 1, there is shown one embodiment of a system for automatically classifying images and video sequences. The classification system 10 includes a processor 109 operatively coupled to a display 103, a pointing device 105, a keyboard 111, a mass storage device 107, and an addressable memory 117. In the preferred embodiment the processor 109 is from the 68000 family or PowerPC family produced by Motorola, Inc., and used in the Macintosh™ brand of personal computers manufactured by Apple Computer, Inc. The mass storage device 107 is for permanently storing images, including graphic images, digitized photographs and video sequences, including digitized (or digitally produced) video images, or animations. The mass storage device 107 is conventional design, with sufficient capacity, preferably in excess of 500 Mb, to store a large number of digitized images or video sequences. The mass storage device 107 may be a large capacity hard disk, a CD-ROM, WORM, laser-disk, or other magnetic, optical, or similar device for storing large volumes of digitized video. The images may be stored in the mass storage device 107 in an image database 113, or other suitable data storage for easy retrieval and indexing. Images are input into the image database 113 by digitizing them with the digitizer 101, or by composing them in conventional graphic design or video production applications. The display 103 is also of conventional design and should have sufficient resolution to display at least 640×480 pixels, preferably with at least 16 bit color depth. The display 103 is also used to display a user interface to the classification system 10, the user interface provided by the user interface controller 125. The pointing device 105 may be a mouse, a stylus, a touch-sensitive screen, or a voice activated command processor, or the like device, for providing inputs to the processor 109 via the user interface controller 125, such as for controlling a cursor and other elements provided in the user interface. A keyboard 111 is also provided for inputting commands to the classification system 10.

The addressable memory 117 stores a classification software application 119 that controls the processor 109 for effecting the methods of the present invention. The classification application 119 includes a category trainer 121 which determines the eigen vectors representing each category. The eigen vector generator 131 creates dot product matrices for each category. The user interface controller 125 manages the display of the user interface and receives and interprets user commands input to the classification application 119. The image projector 123 projects an image or set of primitive attributes onto a set of eigen vectors during category classification. The best match detector 127 determines the classification into a specific category by finding the category with a lowest distortion value. The space transformer 129 is used to transform an image or video frame into a canonical space of a given primitive attribute. The operation of these various code modules is further described below.

This description will hereafter refer to the use of the system 10 to classify video sequences, which are comprised of a temporal series of related video frames, and it is understood the invention can be used to classify individual video images or frames.

Figure 2:
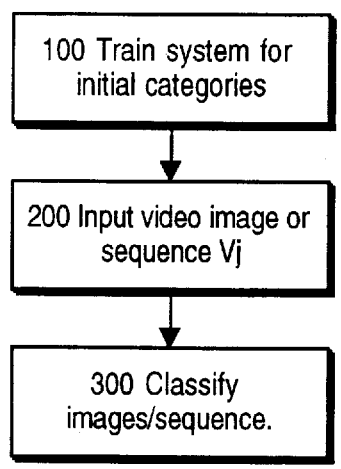
FIG. 2 is a flowchart of the overall method of classifying video images.

Referring to FIG. 2 there is shown a flowchart of the basic steps used to automatically classify video sequences according to the invention. First, the classification application is trained 100 for an initial set of categories C that will be used to classify video sequences V in the image database. The training establishes the individual categories C, and determines the eigen values and eigen vectors that will define each category C. Once the categories C have been trained, the user inputs 200 a new video sequence into the system, or retrieves one from storage in the image database. The video sequence is then classified using one of the classification methods of the present invention. These include orthogonal decomposition of each video sequence using image attributes, orthogonal decomposition of each video sequence in the pixel domain, and a neural net based classification. Each of these operations is more completely described below.

Category Definition

Figure 3:
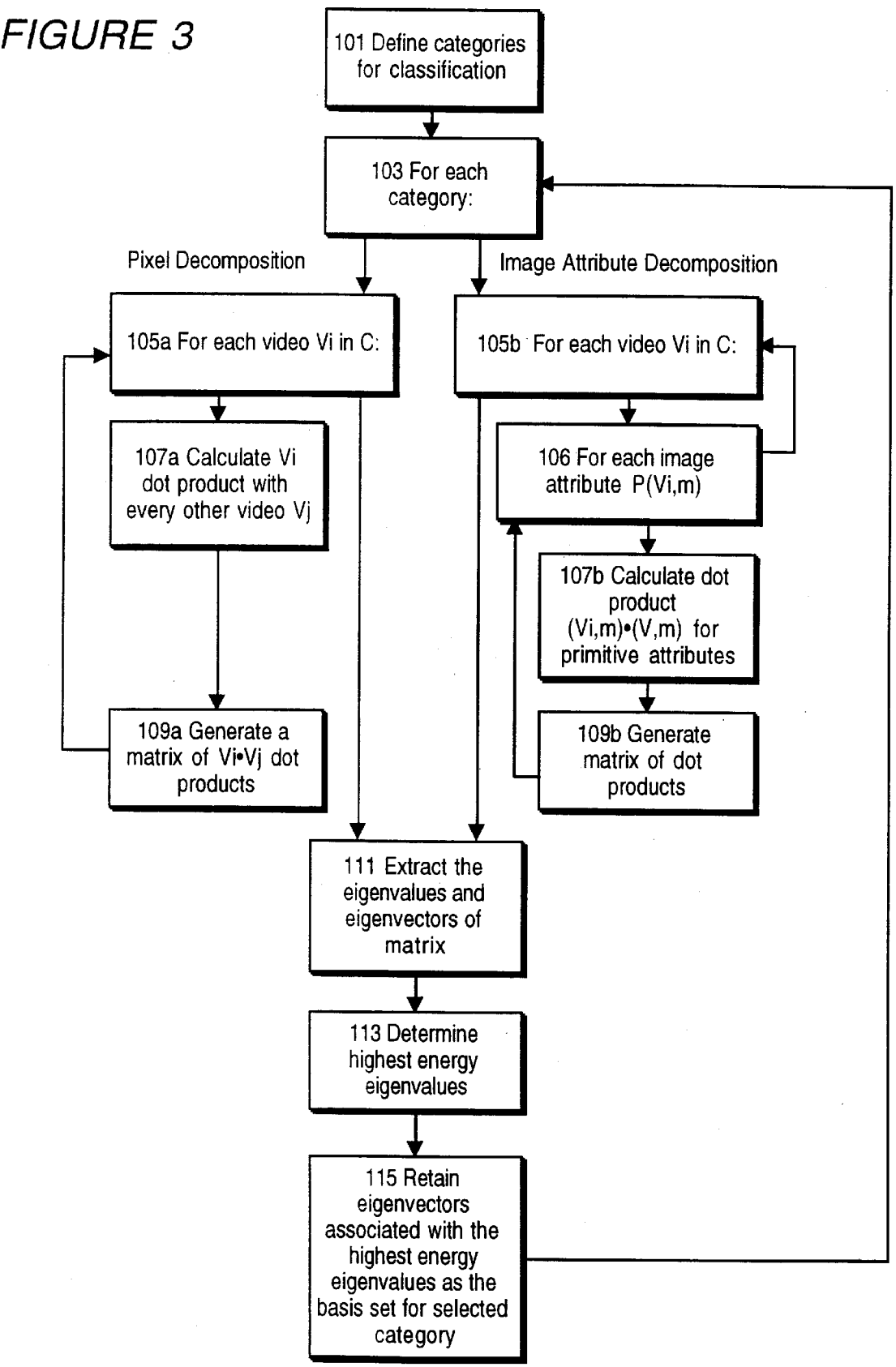
FIG. 3 is a flowchart of a method of categorizing video images for classification.

In order to classify a set of video sequences V, a number of categories C must be previously developed, and this is accomplished by the category trainer 121 module. Referring to FIG. 3 there is shown a flowchart of training process managed by the category trainer 121.

Figure 4:
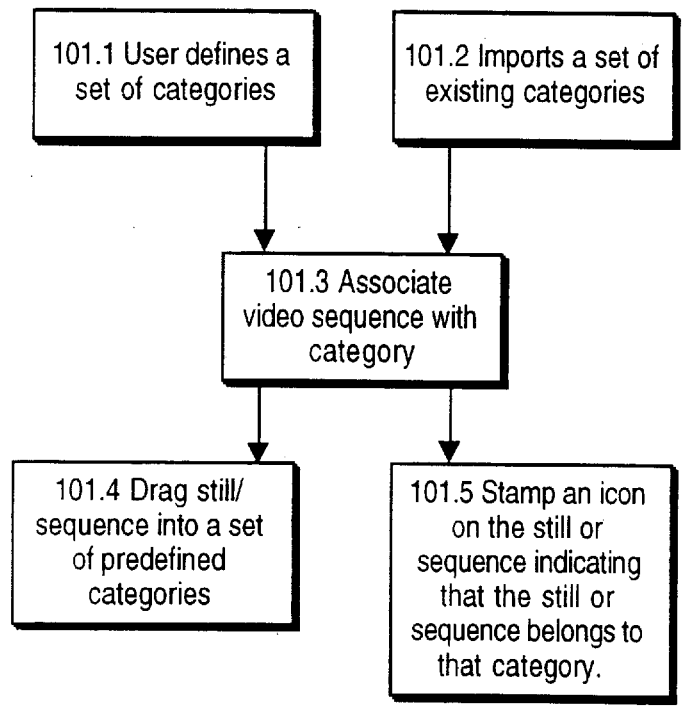
FIG. 4 is a flowchart of a method for manually defining categories for classification.

First a number of categories C are defined 101 for classification. Category definition can be performed either manually by the user, or automatically by the system. Referring to FIG. 4, when done manually, the user creates 101.1 a number of category labels to be used to segregate any input video sequences. In a preferable user interface, the categories C are iconographically represented as individual folder with appropriate labels. In such a user interface, the user can access categorized video sequences by conventionally opening various folders. In an alternative user interface, the category labels may be listed as a series of text items. In addition to defining new categories, the user may import 101.2 an existing set of categories. To manually establish the quantitative parameters of each category Cj the user then associates 101.3 any number of video sequences with a selected category Cj. In a preferred user interface, this is done by moving an icon representing each video sequence into the desired category folder. For example, the user may establish a category folder for video sequences containing footage of horses, and would then move 101.4 icons representing various different video sequences of such footage into the category folder. In another user interface embodiment, the user may designate a category, for example by selecting a category name from a list, and then select or "stamp" 101.5 a number of video sequences in order to indicate their inclusion in the category. The steps defining different categories and associating video sequences with selected categories can be repeated as desired by the user.

Figure 5:
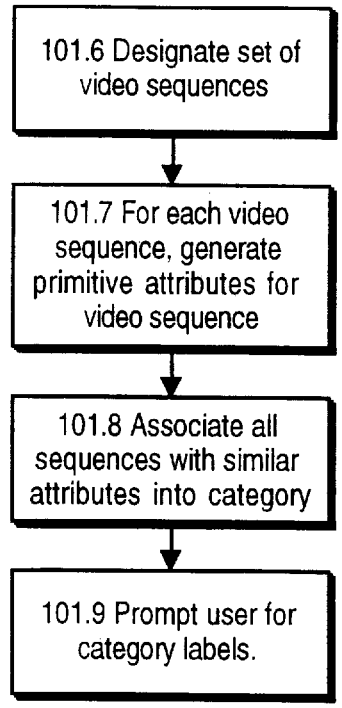
FIG. 5 is flowchart of a method for automatically defining categories for classification.

The user may also decide to have the system automatically determine the categories C that a given number of video sequences V fall into. This is done as follows, as shown in FIG. 5. First, the user designates 101.6 a set of video sequences V to categorize. For each video sequence Vi designated, the category trainer 121 generates 101.7 a set of primitive attributes for the video sequence. The primitive attributes are quantitative measures of various scalar and complex feature sets of a video sequence. The primitive attributes include an average binned color histogram of all frames in the video sequence, average luminance or intensity, Wold texture parameters, average motion vectors, and the like. These primitive attributes can be used to describe a video sequence as a vector in an orthogonal vector space defined by the distinct primitive attribute types. Once the primitive attributes of all of the video sequences have been determined, the category trainer 121 then associates 101.8 video sequences with similar sets of primitive attributes into distinct classes. The set of primitive attributes for a particular video sequence can be thought of as a vector, with the value of each primitive attribute being a component of the vector. The vectors for all the sequences are clustered using LBG (Linde-Buzo-Gray), or a similar vector analysis. The result of this clustering is the association of similar video sequences with a same centroid. Once all of the video sequences have been segregated, the category trainer 121 then prompts 101.9 the user to input a name for each category.

When the video sequences V have been segregated into different categories C, either manually or automatically, the category trainer 121 then calls the eigen generator 131 to create a basis set of eigen values and eigen vectors for each category using either pixel decomposition or primitive attribute decomposition.

Category Training

Referring again to FIG. 3, with pixel decomposition, the category trainer 121 creates a basis set of eigen values and eigen vectors representing the luminance and color characteristics of video sequences in each category Cj. This is done as follows. A given category C has Vn video sequences, n>1.

Each video sequence is a concatenation of frames. A video sequence then represented is as a vector V=<$F_1, F_2, F_3, \ldots F_n$>, where each F is a string of pixel values.

For each video sequence Vi in category C, $1 \leq i \leq n$, the dot product of Vi is taken 107a with every video sequence Vj, producing 109a a Vn·Vn covariance matrix of dot products:

$$\begin{bmatrix} V_1 \Sigma V_1 & V_1 \Sigma V_2 & V_1 \Sigma V_n \\ V_2 \Sigma V_1 & V_2 \Sigma V_2 & V_2 \Sigma V_n \\ V_n \Sigma V_1 & V_n \Sigma V_2 & V_n \Sigma V_n \end{bmatrix}$$

In the preferred embodiment preprocessing is used to remove repeated or redundant frames and consequently reduce the vector dimension of the covariance matrix.

Alternatively, the video sequences V can be decomposed using their primitive image attributes instead of the pixel values. In this case, for each video sequence Vi, the primitive attributes calculated above are retrieved, each video sequence Vi having primitive attributes Vi,m, where m indexes each different type of primitive attribute. Then for each primitive attribute Vi,m, the dot product is taken with the primitive attribute Vj,m of each video sequence Vj, here producing a set of m covariance matrices of dot products, one for each primitive attribute type. Each category Cj thus has a set of m covariance matrices.

In either case, either pixel decomposition or primitive attribute decomposition, the eigen generator 131 is called by the category trainer 121 to produce the appropriate matrices. Once the covariance matrix or matrices of dot products is generated, it is diagonalized by the eigen generator 131 to extract 111 a set of eigen values and eigen vectors representing the category Cj. The eigen values are then ordered 113 to determine the highest energy eigen values. The eigen vectors associated with the highest energy eigen values are retained 115 by finding the maximum eigenvalue emax, discarding eigenvalues ei (and associated eigenvectors) when ei/emax is less than a defined threshold. The threshold is preferably chosen to be 0.1 to form a basis set of eigen vectors for the category Cj. This process is repeated for each category C to be trained, and can also be repeated as desired by the user to retrain categories when new video sequences are added or removed from a category.

Automatic Classification

After the categories have been initially trained, the user may then automatically classify new or additional video sequences. A new video sequence Vn is then input 200 into the system 10 from the video source, or by other means, including computer based generation using multimedia authoring tools. The user then designates the video sequence to be classified by selecting the video sequence Vn and issuing an appropriate command, such as retrieving a menu item, or similar means. The present invention provides for classification of the video sequence by several different methods, again including orthogonal decomposition of primitive attributes or decomposition of the pixel domain.

Figure 6:
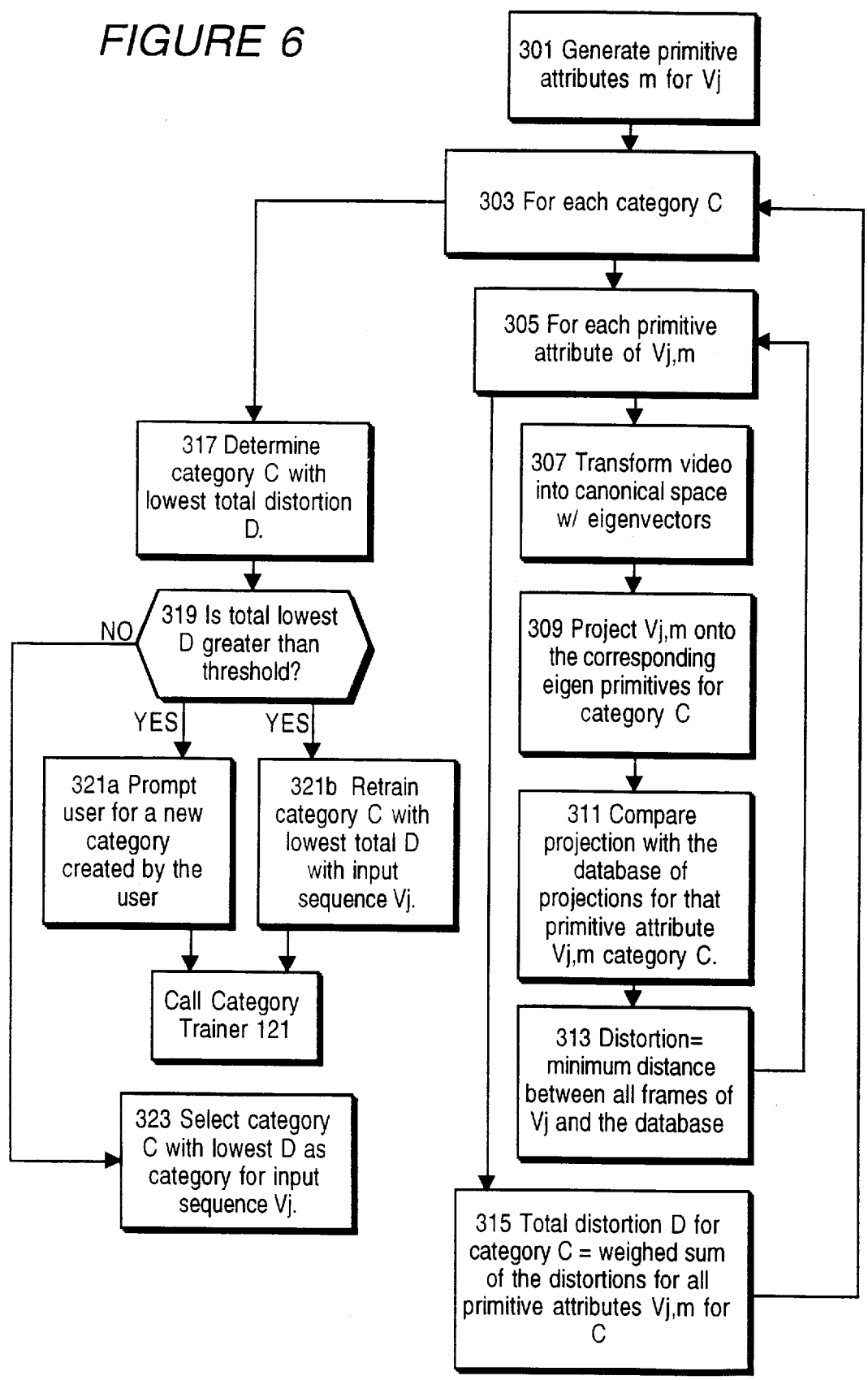
FIG. 6 is a flowchart of a method of automatically classifying video sequences by orthogonal decomposition of primitive attributes.

Referring to FIG. 6 there is shown a flowchart for automatically classifying video sequences by orthogonal decomposition of primitive attributes. First, the set of primitive attribute m is generated 301 for the new video sequence Vn. This is done for each frame of the video sequence. Then for each existing category C, each of the primitive attributes m for each frame of Vn are compared with the corresponding eigen vectors representing the primitive attributes of C. This is done for each primitive attribute Vn,m in each frame, by first transforming 307 the video sequence Vn into the same canonical space as the eigen vectors for the category. This transformation may include correction of scale, rotation, normalization of the primitive attribute value, spatial distortion, blurring, and the like. This transformation is further described with respect to FIG. 8.

Once the video sequence Vn has been canonically transformed 307, it is projected 309 by the image projector 123 onto each matrix of eigen vectors that was generated for each of the primitive attributes m. Each projection takes the dot product of primitive attribute Vn,m and the corresponding covariance matrix M for the category C. Projection generates a vector, each component of the vector corresponding to the projection onto an element of the eigen set. The vector for each primitive attribute is then compared 311 to all the projections for that primitive attribute from all video sequences V in category C. The comparison takes the distance, or sum of squared differences of vector components, between a primitive attribute vector m, and all the vectors from the video sequences in C. This distance gives an indication of how "close" a given video sequence Vn is to other video sequences V in category C with respect to the eigen vectors defining the primitive attribute m for the category. As the projections for each primitive attribute are done for each frame of a video sequence Vn, the minimum distance between all frames of Vn and the set of projections is taken 313 as the distortion for that primitive attribute Vn,m with respect to category C.

This process of transformation, projection, and comparison is repeated 305 for each primitive attribute m for the covariance matrix of category C. This produces for each category C a set of distortion values for the video sequence Vn. The total distortion D for each category C is taken 315 as the weighted sum of the distortion values for all image attributes Vn,m for that category:

$$D_C = \sum_{k=1}^{m} w_k d_k$$

where Dc is the total distortion for each category C for a new video sequence Vn, $w_k$ is the weighting for each primitive attribute m, and dk is the distortion value 11 for video sequence Vn with respect to the projections for the primitive attribute m.

The total distortions Dc are then sorted by the best match detector 127 and the category C with the total distortion Dl is determined 317 to be the appropriate classification of the new video sequence Vn. In other words, the new video sequence is most similar to, or least different from, other video sequences in the selected category along each of the orthogonal dimensions represented by the different primitive attributes used to differentiate the categories.

It may turn out that a new video sequence Vn does not properly belong to any existing category. This arises when the lowest total distortion Dl is greater 319 than a predetermined threshold. The threshold can be adjusted by the user to allow either broader categories (a higher threshold value) or narrow, more precise categories (a lower threshold). If the lowest total distortion Dl is greater than the threshold, then the system 10 prompts 321a the user for a new category Cn, and the system 10 will then add the video sequence Vn to the new category Cn, and invoke the category trainer 121 to develop the appropriate covariance matrices for the new category. If the user does not wish to create a new category, for example, because the category with the lowest total distortion Dl is the category which the user wants the video sequence Vn classified in, then the user may cause the system 10 to retrain category C by calling the category trainer 121 to retrain the category by including the new video sequence Vn.

Figure 7:
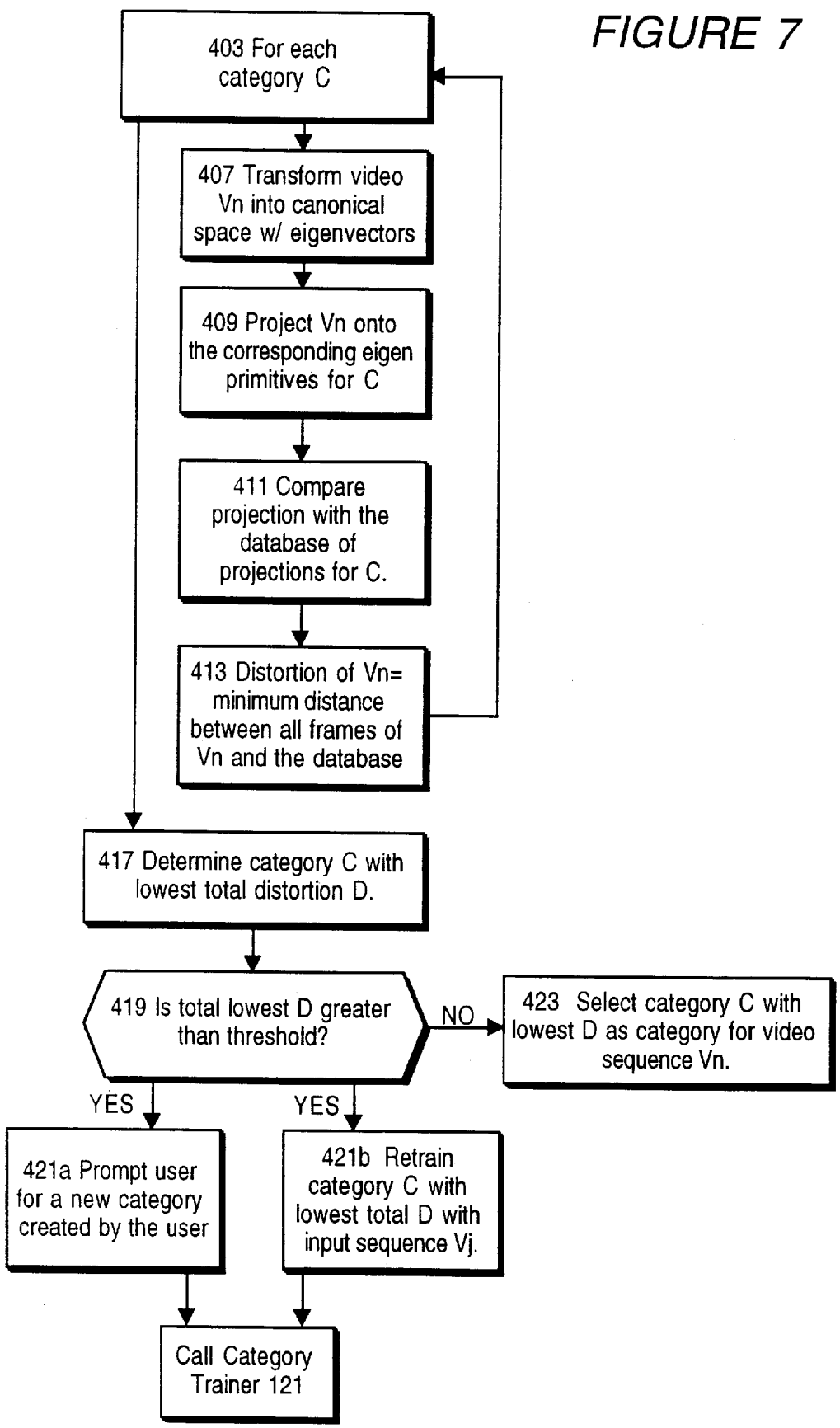
FIG. 7 is a flowchart of a method of automatically classifying video sequences by orthogonal decomposition of the pixel domain.

Classification of a new video sequence Vn may also be done by orthogonal decomposition on the pixel domain. FIG. 7 shows a flowchart for classifying video sequences in this manner. As described above, when the category trainer 121 was used to train the categories using pixel decomposition, there is a created a single covariance matrix of eigen vectors for the category. In order to classify then, for each category Ci, the video sequence is transformed 407 into the canonical space of the eigen vectors for the category, according to the method described with respect to FIG. 8. Each frame of the video sequence Vn is then projected 409 onto the covariance matrix for the category Ci, that is, projecting the pixel values of the frames of Vn onto the set of eigenvectors for the category Ci. In the preferred embodiment, subsampling of the frames of the video sequence and removal of repeated or redundant frames is done prior to projection.

The projection is then compared 411, as above, with the projections for all other video sequences in category Ci, to produce a distortion value, as the sum of squared differences. The minimum distortion value for all frames in the video sequence Vn is taken 413 as the distortion for the video sequence Vn in category Ci. This process is repeated 403 for each category C.

The category C with the lowest total distortion Dl, as defined above, is designated 417 as the classification of the new video sequence Vn. Again, the system will test 419 whether Dl exceeds a defined threshold, and if so, provide for either creating 421 a new category with the new video sequence Vn as its member, or retraining 423 the category with Dl.

Image Transformation

Figure 8:
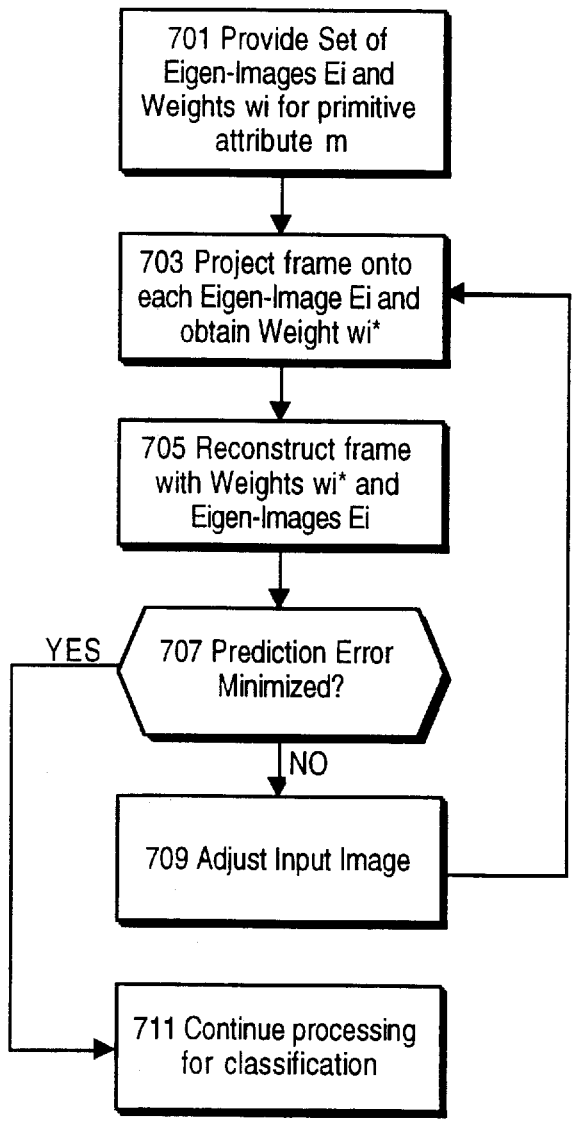
FIG. 8 is a flowchart of a method of transforming an image or video sequence into a canonical space defined by a set of eigen vectors.

Referring now to FIG. 8, there is shown a flowchart for a method for transforming an image or video sequence into a canonical space defined by a set of eigen vectors. Transformation into the canonical space ensures that the projection of a video sequence onto the covariance matrices produces accurately representative vectors which represent significant, rather the spurious, differences between the primitive attributes of the video sequence and the primitive attributes of the category. As one example of the type of transformation that can be performed, scaling of an image will be used. It is understood that other transformations, such as luminance normalization, rotation, stretching, normalization of color, or the like, can be similarly performed.

In order to normalize scaling in a particular input image for category classification, a set of eigen-vectors Ei and weights wi is provided 701 for a given primitive attribute, here scale. The eigen vectors for the primitive attribute are determined from a predetermined sample image that has canonical values for the image attribute. For scale, there would be different resolutions (sizes) of the sample image. The eigen vectors for the sample image thus represent the canonical space for the primitive attribute.

A frame from the video sequence Vn being classified is projected 703 onto each eigen vector Ei, and a weight wi* is obtained for each eigen vector Ei. The frame is then reconstructed 705 forming reconstructed frame $\hat{I}$ from all the eigen-images Ei with the new weights wi*. The reconstructed frame $\hat{I}$ is then compared 707 with the sample image to produce a reconstruction error by taking the sum of the squared pixel to pixel difference between the sample image and $\hat{I}$. This reconstruction error is dependent on the scale error. When the reconstruction error is minimized, then the scale of the video frame has been correctly normalized. The reconstruction error is minimized as follows.

After a first reconstruction error e1 is generated as described (or using other equivalent difference measures), the scale of the input image is adjusted 709 by upsampling or downsampling the image by a predetermined amount. The adjusted input image is again projected 703 on the eigenvector set to generate another set of weights wi*. Another reconstruction error e2 is then determined by reconstructing 705 the frame as described. After several reconstruction errors have been created, preferably at least 3, the direction of change between the errors is determined, indicating whether the reconstruction errors are increasing or decreasing. If the reconstruction errors are increasing, then the scaling is in the wrong direction, and the direction of scaling (i.e. enlargement or reduction) is reversed. If the reconstruction errors are decreasing then the scale is moving in the correct direction, and the scale can continue to be adjusted 709 in the same direction. This method allows the system to normalize the scale for an input image. When the reconstruction error is minimized, the video sequence can continue 711 to be processed as above for classification.

The foregoing transformation method can be used for any image attribute that can be represented by a set of eigen vectors Ei and a set of weights wi, such as particular textures, colors, gradients, any defined region of pixels, and the like, or any combination thereof. In addition to normalization of scaling, the reconstruction errors can be employed to normalize translations, rotations, or other operations on the input image.

The preferred embodiment of the invention has been described as computer based system employing particular software for configuring and operating the computer system. Alternatively, the invention may be embodied in application specific integrated circuitry, or in programmable logic devices such as programmable logic arrays, digital signal processors, or the like. This would allow the invention to be incorporated in video storage and playback systems, such as dedicated video storage or playback systems, for example, or systems based on CD or similar optical disk technology that allow large volumes of digitized video to be captured, processed, and stored for subsequent retrieval.

We claim:

1. A method of automatically classifying a video sequence into a category, the video sequence including at least one frame, comprising the steps of:

creating a set of categories, each category representing a set of video sequences having a set of similar primitive image attribute values orthogonally representing the category, by:
receiving a user specification of selected video sequences;
determining for each selected video sequence at least one primitive image attribute value;
segregating the video sequences into sets, each set of video sequences having a set of similar primitive image attribute values;
defining each category by associating each of the sets of video sequences with each category;
for each category, creating a covariance matrix of dot products for each pair of the video sequences in the category; and
determining a set of eigen vectors from the covariance matrix as the set of similar primitive image attribute values of the category;

receiving an input video sequence;

determining a distortion measure for each category with respect to the input video sequence by projecting the input video sequence onto the set of similar primitive image attribute values of each category; and classifying the input video sequence in the category having a minimum distortion measure.

2. The method of claim 1, wherein the step of creating a covariance matrix of dot products further comprises the steps of:

for each primitive image attribute value, creating a covariance matrix of dot products for the primitive image attribute value for each pair of video sequences; and wherein the step of determining a set of eigen vectors further comprises the step of:

determining from the covariance matrix for each primitive image attribute value a set of eigen vectors, the set of eigen vectors being the set of similar primitive image attribute values of the category.

3. The method of claim 2, the step of determining a distortion measure, further comprising for each category, the steps of:

determining for the input video sequence a set of primitive image attribute values;

determining for each primitive image attribute value of the input video sequence a primitive image attribute vector comprising a dot product between the primitive image attribute value and the set of eigen vectors of the set of similar primitive image attribute values for the category;

comparing each primitive image attribute eigen vector with the primitive image attribute vectors for each input video sequence associated with the category to produce a distortion measure for each primitive image attribute value of the input video sequence;

determining for each primitive image attribute value of the input video sequence a distortion measure having a minimum value; and determining a total distortion measure for the category as a function of the minimum distortion measures for each primitive image attribute value of the input video sequence.

4. The method of claim 1, the step of determining a distortion measure, further comprising for each category, the steps of:

determining for each frame of the input video sequence a frame vector comprising a dot product between the frame and the eigen vectors of the category;

comparing each frame vector with frame vectors for each video sequence associated with the category to produce a distortion measure for each frame; and determining the distortion measure having a minimum value.

5. The method of claim 1, further comprising the steps of:

comparing the minimum distortion measure with a threshold; and if the minimum distortion measure exceeds the threshold, creating a new category including the input video sequence.

6. The method of claim 1, further comprising the steps of;

comparing the minimum distortion measure with a threshold;

if the minimum distortion measure exceeds the threshold, associating the input video sequence with the category having minimum distortion measure;

recreating the covariance matrix of dot products for each pair of video sequences associated with the category; and, re-determining the set of eigen vectors from the covariance matrix as the set of similar primitive image attribute values of the category.

7. A computer system for automatically classifying an input video sequence including at least one frame into a category, comprising:

a processing unit programed to:

create a set of categories, each category representing a set of video sequences having a set of similar primitive image attribute values orthogonally representing the category, the categories created by the processing unit further programmed to:

receive a user specification of selected video sequences;

determine for each selected video sequence at least one primitive image attribute value;

segregate the video sequences into sets, each set of video sequences having a set of similar primitive image attribute values;

define each category by association of each of the sets of video sequences with each category;

for each category, create a covariance matrix of dot products for each pair of video sequences in the category; and determine a set of eigen vectors from the covariance matrix as the set of similar primitive image attribute values of the category;

receive the input video sequence;

determine a distortion measure for each category with respect to the input video sequence by projecting the input video sequence onto the set of similar primitive image attribute values of each category; and classify the input video sequence in the category having a minimum distortion measure.

8. The computer system of claim 7, further comprising:

a storage device, operatively coupled to the processing unit, and storing thereon a plurality of video sequences, a plurality of categories, each category defined by a set of similar primitive image attribute values and having a category designation;

a video input device operatively coupled to We storage device, for receiving video sequences from a source external to the computer system, and storing the video sequences on the storage device; and a display device, operatively coupled to the processing unit, for displaying thereon selected portions of selected video sequences, and flier displaying category designations; and an electronic pointing device, responsive to user inputs, for associating a selected portion of a selected video sequence with a selected category designation.

9. The computer system of claim 7, wherein the processing unit is further programmed to:

for each primitive image attribute value, create a covariance matrix of dot products for the primitive image attribute value for each pair of video sequences; and, determine from the covariance matrix for each primitive image attribute value a set of eigen vectors, the sets of eigen vectors being the set of si similar primitive image attribute values of the category.

10. The computer system of claim 9, wherein the processing unit is further programmed to:

determine for each primitive image attribute value of the input video sequence a primitive image attribute vector as a dot product of the primitive image attribute values and the set of eigen vectors of the set of similar primitive image attribute values for the category;

produce a distortion measure for each primitive image attribute value by comparing each primitive image attribute vector with primitive image attribute vectors for each video sequence associated with the category;

determine for each primitive image attribute value a distortion measure having a minimum value; and determine a total distortion measure for the category as a function of the minimum distortion measures for each primitive image attribute value.

11. The computer system of claim 7, wherein the processing unit is further programmed to:

determine for each frame of the video sequence a frame vector as a dot product between the frame and the eigen vectors of the category;

compare each free vector with frame vectors for each video sequence associated with the category to produce a distortion measure for each frame; and determine the distortion measure having a minimum value.

12. The computer system of claim 7, wherein the processing unit is further programmed to:

compare the minimum distortion measure with a threshold; and if the minimum distortion measure exceeds the threshold, create a new category and include the input video sequence.

13. The computer system of claim 7, wherein the processing unit is further programmed to:

compare the minimum distortion measure with a threshold;

if the minimum distortion measure exceeds the threshold, associate the input video sequence with the category having the minimum distortion measure;

recreate the covariance matrix of dot products for each pair of video sequences associated with the category; and, re-determine the set of eigen vectors from the covariance matrix as the set of similar primitive image attribute values of the category.

* * * * *

UNITED STATES PATENT AND TRADEMARK OFFICE
CERTIFICATE OF CORRECTION

PATENT NO : 5,872,865

DATED : Feb. 16, 1999

INVENTOR(S) : Normile et al.

It is certified that error appears in the above-identified patent and that said Letters Patent are hereby corrected as shown below:

In the Claims:

Claim 8, Column 12, Line 40, please delete "We" and insert - -the- - in its place.

Claim 8, Column 12, Line 46, please delete "flier" and insert - -further- - in its place Signed and Sealed this Eighth Day of May, 2001

Attest:

NICHOLAS P. GODICI

Attesting Officer

Acting Director of the United States Patent and Trademark Office